Patented Apr. 21, 1931

1,801,621

UNITED STATES PATENT OFFICE

ARTHUR BIDDLE, OF TRENTON, NEW JERSEY, ASSIGNOR TO UNITED PRODUCTS CORPORATION OF AMERICA, A CORPORATION OF DELAWARE

ADHESIVELIKE AQUEOUS DISPERSIONS OF MATTER

No Drawing.    Application filed July 21, 1927.   Serial No. 207,578.

This invention relates to the treatment of aqueous dispersions with chlorine or chlorine compounds, said aqueous dispersions comprising, among other things, a normally water-resisting, flexible gummy colloidal substance, an alkaline earth hydroxide with or without the addition thereto of a water-absorbing, water-miscible, water-soluble or hydrophillic colloid.

I have found that when alkaline earth hydroxides are used in the treating or preparing of aqueous dispersions of flexible gums like chicle and chicle substitutes, rubber and rubber containing substances of natural or synthetic origin, many new properties are added to the compositions if the compositions or ingredients thereof are treated to or mixed with chlorine or a chlorine containing substance or compound. It has been noticed that when water-soluble colloids such as animal or marine life glues, casein or casein glues, starches or starch degradation products, albumens and other decomposible substances are employed in aqueous dispersions or normally water-resisting gummy colloids that the addition thereto of a chlorine compound such as zinc chloride, copper or sodium or potassium chloride, seem to make the compositions so treated more water-resisting in their dehydrated condition and also more resistant to bacterial decay. Many other properties are apparent according to the particular ingredients used and the season of the year.

By the alkaline earth hydroxides are meant the hydroxides of such as calcium, barium, strontium or magnesium, but more particularly of calcium. It is to be understood that the oxides of such substances are within the purview of my disclosure as such oxides if used will generally be changed to hydroxides in the presence of water. Further the oxides or the hydroxides may be the natural earthy substances or may be the product of chemical processes such as for instance precipitated lime. The alkaline hydroxides as produced from calcined marine shells or bony materials may also be utilized in my invention.

The flexible gums such as chicle, balata, gutta-percha, rubber or rubber containing substances either natural or synthetic may be aqueously dispersed in the making of the compositions as herein disclosed or they may be initially in their artificially dispersed state or in their natural or latex condition, either preserved or untreated.

In selecting the chlorine compound to be used in the aqueous dispersion, consideration must be given to the ingredients of the composition. Most alkaline earth hydroxides are only slightly soluble in water and it appears that the addition of chlorine compounds like sodium chloride or ammonium chloride makes the said hydroxide more soluble or makes it combine more readily with other ingredients in the composition. The more soluble the said hydroxide is the more discretely will it be mixed in the aqueous dispersion and the more readily will it assume an insoluble form on contact with the air in the dehydrated product such as the converting of calcium hydroxide to calcium carbonate or to a double product such as calcium caseinate carbonate or calcium albumino carbonate or other salt as the case may be or the presence of other chemicals may determine. It is possible that the addition of chlorine compound acts on the alkaline hydroxide and the increased alkalinity tends to preserve and stabilize the aqueous dispersion of the normally water-insoluble flexible colloid. Or the chlorine compound may of itself be a stabilizer and a retarder of bacterial growth. The latter seems to be the case when a copper chloride is used. It may also be that the chlorine compound combines directly with the alkaline earth hydroxide to form a chloride thereof, which, in its transition state may exert beneficial effects on the aqueous composition.

As an example of a simple embodiment of my invention will be given the following:

| | Parts by weight |
|---|---|
| Rubber latex | 100 |
| Calcium hydroxide | 5 |
| Water | 5 |
| Sodium chloride | 1 |

The water is mixed with the calcium hydroxide and sodium chloride which composition is then added to the rubber latex. This composition may be used as a simple adhesive for binding fibers, ground cork, sawdust and the like. Where vulcanization is desired vulcanizing compounds may be added.

If the composition is to be utilized as a strong glue, having water-resisting properties when dry the following example may be used as a guide, the proportions of which may be changed to suit conditions:

| | Parts by weight |
|---|---|
| Casein | 100 |
| Lime (calcium hydroxide) | 20 |
| Sodium carbonate | 5 |
| Sodium tungstate | 3 |
| Tri-sodium phosphate | 10 |
| Water (used to dissolve the above) | 350 |
| Sodium chloride (10% solution) | 30 |

Although not necessary it is preferable to soak the water soluble colloid in cold water first and then add the solvents if solvents or breaking down or expanding agents such as the lime, sodium carbonate and tungstate and phosphate are as in this case, used. Altho the salt or chloride of sodium may be added dry it is preferable to add it in solution form, and to the casein solution. The above composition is then mixed with:

| | Parts by weight |
|---|---|
| Rubber latex | 200 |

It is to be understood that other solvents for casein may be used and that other chlorine compounds may be added thereto such as for instance, zinc chloride, copper chloride or ammonium chloride. But care must be taken to avoid a chloride which, like zinc or antimony chloride might have a coagulating effect not only on the water soluble colloid but also on the water-resisting gummy colloid like rubber latex. In this case a very dilute solution of the chlorine compound must be slowly added to the composition or the powdered or dissolved chloride may be mixed with or emulsified in any oily protective substance such as a drying oil like linseed oil or non-drying oily substances like petroleum, coal tar, vegetable oils or fats, or waxes. Mineral and marine oils and waxes are also suitable. Where the oily substance is not to constitute an essential part of the finished composition, volatile oils may be used. The oily substances so used and if protecting the dry powdered chlorine compounds may also act as a medium to avoid lumps and dust if the chlorine compound is mixed with the other colloidal substances in dry form. Such as the coating of copper chloride with xylol or paraffin oil and then mixing it with dry casein and the dry casein solvents, when such materials are to be shipped, are kept in storage before being used in combination with the aqueous dispersion of the water-resisting gummy colloid.

If the aqueous dispersion will not coagulate or precipitate on the addition thereto of an acid substance, or if the dispersion or ingredients in their initial or uncombined state are compatible to acid substances, then chlorine gas may be allowed to act directly on said dispersions or ingredients thereof.

There are times when the nature of the compositions as meant within the scope of my invention will be more "co-hesive" than adhesive. That is to say, the gummy colloidal substance will unite with its own particles more readily than the particles will unite with foreign substances. This is due probably to an inversion of phase from an internal to an external one, the gummy water-resisting substance being initially in the internal phase. As an example of this may be given:

| | Parts by weight |
|---|---|
| Rubber latex | 100 |
| Magnesium oxide | 10 |
| Zinc oxide | 10 |
| Magnesium chloride | 3 |

To the above may be added filling materials well known to the art, and preferably in a wet condition to the latex before the addition of the other ingredients above mentioned. On the inversion of phase if it happens, the mass will become plastic and the water may be removed by pressing or drying.

It is sometimes desirable to use a plurality of water-soluble colloids or a plurality of the normally water-resisting gummy colloids in aqueous dispersion and together. This is done for sake of economy, to secure elasticity, adhesiveness and other properties. As an example of this will be given the following:

| | Parts by weight |
|---|---|
| Sodium silicate (approximately 40% solution) | 50 |
| Blood albumen (30% solution in water) | 50 |
| Gum chicle (dispersed by above colloids) | 10 |
| Calcium hydroxide | 10 |
| Calcium chloride | 2 |
| Sodium chloride | 2 |

The silicate, albumen, and chicle are preferably mixed together first, the lime then added in dilute solution and the chlorides added to the combined mass.

Another example similar to the above which may be used as an adhesively applied sizing or adhesive vehicle for sizing or coating materials is given in the following:

| | Parts by weight |
|---|---|
| Starch (preferably cassava) | 10 |
| Dextrine (British gum preferred) | 10 |
| Animal glue | 10 |
| Water (to dissolve the above) | 100 |
| Rubber latex (preserved with ammonia) | 100 |
| Sulphur (preferably colloidal) | 3 |
| Zinc oxide | 5 |
| Magnesium oxide | 10 |
| Calcium hydroxide | 5 |
| Magnesium chloride | 3 |
| Ammonium chloride | 2 |

The starch, dextrine and glue are preferably first dissolved in the water and the sulphur, magnesium, zinc, calcium hydroxide or oxide are added thereto with additional water if necessary. The magnesium and ammonium chloride may be added to the water-soluble gums or the aqueous composition when all the ingredients are mixed together. Filling materials such as clays, stearates, coloring agents, powdered cork or wood, fibrous material, etc. to give body or produce certain results as desired may be added.

When decomposible and water-soluble colloids are used it is desirable at times to make these colloids still more water-resisting and bacteria proof, and to do this an insolubilizing agent is used to give these properties to the water-soluble colloids. As examples of this insolubilizing step will be given the adding of a small percentage (generally not more than one to three percent by weight) of formaldehyde or hexamethylenetetramine to 100 parts by weight of casein, or the adding of a small amount of potassium chromate to glue mixtures or the addition to glue of calcium tannate, this substance also has an insolubilizing action on casein mixtures. There might also be mentioned the adding of about 5% of paraformaldehyde to albuminous colloids in the presence of ammonia. The insolubilizing of the water-soluble colloids is at times and especially when in combination with a substance like rubber latex, very important, as the lack of water-resistance of the water-soluble colloid would tend to decrease the water-resistance of the rubber in the latex after dehydration.

Other water-soluble colloidal substances such as wool-grease, Turkey red oil, soaps and the water-absorbing materials like colloidal clays or bentonite clay are adapted to be used in my invention.

In order to give certain properties to the finished compositions, resins, tars, waxes, camphors and like materials may be added to, emulsified, dispersed or otherwise mixed with the aqueous dispersion. Nor is the adhesive-like composition meant to be restricted to any particular class or grade of adhesion as such adhesion may be weak or strong, co-hesive or adhesive; to unite materials such as two boards or countless and minute particles of matter into masses of varying degrees of plasticity, flexibility or solidity.

Further it is to be understood that vulcanizing ingredients well known to those familiar with the vulcanizing and accelerating arts may be added thereto and vulcanized either with the hot or cold vulcanizing processes.

Although in the examples given only small percentages of the chlorine compounds were given these percentages may be increased to amount to more than the weight of the colloids used. As an example of this the magnesium oxide may be increased to 50 parts and the calcium hydroxide may be increased to 25 parts in the last example given. The amount of the magnesium and ammonium chloride may be tripled. When this is done the composition will be more of an adhesive-plastic mass suitable for the incorporation of filling materials.

My invention is meant to include colloidal materials both water-resisting and water-absorbing that have been given preliminary treatment. As examples of this might be mentioned the treatment of starches by the Perkins and Bloede methods whereby the starches are broken down or otherwise treated. Also the treatment of various caseins with solvent chemicals such as ammonia gases, adding fluorides, phosphates and the like to casein in the process of making same. Nor is the casein to be restricted to any particulare casein as derived from any particular process of manufacture as the well known lactic, hydro-fluoric, sulphuric, acetic, or air blown milk caseins. When rennet casein is used strong alkali is necessary to dissolve the casein if used as a solution, if used as a plastic filling material a solvent is unnecessary as heat will make a homogeneous mass of the rennet casein. In the first example given, if a thinner glue and one that will stay fluid longer is wanted the sodium tungstate may be replaced by using in its stead about 5 parts of sodium fluoride.

When the composition is to be used as an adhesive for the binding together of many small particles as the making of imitation corks, then drying and semi-drying oils will make the composition more economical and water-repulsive on the exterior surfaces.

While I have herein described some particular compositions embodying my invention and methods of producing the same, it is to be understood that the invention is not limited to the precise methods, ingredients or proportions mentioned.

Having thus described my invention, I claim and desire to protect by Letters Patent of the United States:

1. A composition of matter in aqueous dispersion comprising rubber latex, an alkaline earth hydroxide, and a water soluble chlorine substance.

2. A composition of matter in aqueous dispersion comprising rubber latex, calcium hydroxide, and a water-soluble chlorine substance.

3. A composition of matter in aqueous dispersion comprising rubber latex, calcium hydroxide, and sodium chloride.

4. A composition of matter in aqueous dispersion comprising a normally water-resisting flexible gummy colloidal substance, a normally water-absorbing colloidal substance, an alkaline earth hydroxide and sodium chloride.

5. A composition of matter in aqueous dispersion comprising rubber latex, a hydrophillic colloid, an alkaline earth hydroxide and a water-soluble chloride.

6. An adhesive-like composition of matter in aqueous dispersion comprising rubber latex, casein, calcium, hydroxide, sodium carbonate, tri-sodium phosphate, sodium fluoride, and a water-soluble chlorine substance.

7. A composition of matter in aqueous dispersion comprising rubber latex, a hydrophillic colloid, calcium hydroxide, a water-soluble chloride and an oil.

8. A composition of matter in aqueous dispersion comprising rubber latex, a water-absorbing colloidal substance, an alkaline earth hydroxide, and a water-soluble metallic base chloride.

9. The method of treating rubber latex which comprises the addition thereto of an alkaline earth hydroxide, a water-absorbing colloidal substance and a water-soluble chlorine substance, the whole being in a state of aqueous dispersion.

In witness whereof I have hereunto set my hand this 19th day of July, 1927.

ARTHUR BIDDLE.